ARRANGEMENT FOR AUTOMATIC SIGNALLING SYSTEM INTENDED FOR RECEIVING VOICE-FREQUENCY CALLING SIGNALS

Filed Feb. 28, 1958 2 Sheets-Sheet 1

INVENTORS
JOHANNES THEODORUS ANTONIUS VAN LOTTUM
JACOBUS DOMBURG
ARIE FERDINAND VERKRUISSEN
BY
Frank R. Jufari
AGENT INVENTORS
JOHANNES THEODORUS ANTONIUS VAN LOTTUM
JACOBUS DOMBURG
ARIE FERDINAND VERKRUISSEN
BY
Frank R. Jifari
AGENT 3,008,009

ARRANGEMENT FOR AUTOMATIC SIGNALLING SYSTEM INTENDED FOR RECEIVING VOICE-FREQUENCY CALLING SIGNALS

Johannes Theodorus Antonius van Lottum, Jacobus Domburg, and Arie Ferdinand Verkruissen, all of Eindhoven, Netherlands, assignors to North American Philips Company, Inc., New York, N.Y., a corporation of Delaware Filed Feb. 28, 1958, Ser. No. 718,326

Claims priority, application Netherlands Mar. 14, 1957

8 Claims. (Cl. 179—16)

This invention relates to arrangements for automatic signalling systems, for example telephone systems, for receiving voice-frequency calling signals of different frequencies which are transmitted, for example, from a subscriber's set to a register in a telephone exchange.

It would be possible in such arrangement to utilize in known manner filters for separating the various calling frequencies. However, the following difficulty is then involved. The filter circuits are required to be so adjusted that signals received through a subscriber's line of high damping provide at the corresponding filter an output signal, the strength of which is greater than a given minimum threshold value. On the other hand, the filter circuits are required to have a certain width in connection with the short duration of the signals and a certain spread in the frequency of the incoming signals. However, signals which are supplied through a line of low damping and which are thus comparatively strong at the input side of the filters are then liable to be passed by a filter which is tuned to another frequency, said signals thus also providing an output signal, the strength of which exceeds said threshold value. The use of an automatic volume control, such as usually employed in wireless receivers, involves difficulty in practice in connection with the comparatively short duration of the signals. If the signals are converted by means of a limiting amplifier into a block voltage, harmonics of the signal are produced, which in turn may give rise to building up of undesired oscillation.

The present invention mitigates these difficulties. The arrangement according to the invention comprises means for determining the duration between two nodes of the signal. Preferably, a retarding device is provided, by which said means are made operative only a predetermined period after the beginning of a signal.

The beginning of a signal may be indicated in known manner by means of a prefix signal or by causing the transmission of a signal to be accompanied by a variation in direct current on the communication line. If desired, the calling signals may alternatively be distinguished from telephone currents by a difference in strength. The retarding device prevents the interval between two nodes of the signal from being disturbed, during measurement, by interfering oscillations which may arise when the signal transmitter is switched on. Said means also provide protection against influencing of the receiver by telephone currents.

In order that the invention may be more readily carried into effect, it will now be described more fully, by way of example, with reference to the accompanying drawings, in which.

Figure 1:
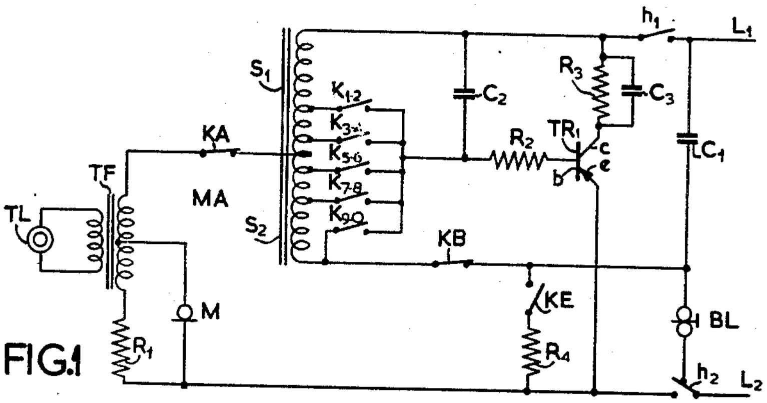
FIG. 1 shows the arrangement of a subscriber's set for transmitting calling signals.

The subscriber's set shown in FIG. 1 comprises a telephone TL and a microphone M, which are included in known manner with the use of a transformer TF and a resistor R1 in an anti-sidetone circuit. The contacts *h1* and *h2* are switch hooks, which are shown in the position in which the handset is inoperative and the bell BL is connected in series with a capacitor C1, via make contact *h2*, between line wires L1 and L2, so that the subscriber may be rung in known manner by means of an alternating voltage on the line. The device for transmitting calling signals comprises an inductance S, the value of which is, for example, 1H and which has a centre tapping MA. In the speaking condition, in which the receiver is removed, a direct current flows via line wire L1, switch hook *h1*, the half S1 of inductance S, contact KA, the microphone circuit, make contact *h2* and line wire L2, so that a certain amount of magnetic energy is accumulated in the inductance S. The portion of this circuit which comprises the winding S1 and contact *h1* is bridged for telephone currents by a winding S2, back contact KB and capacitor C1, the latter having a low impedance for telephone currents and having a value of, for example, 2 $\mu$Fs. Since the telephone currents in the winding S1 and S2 counteract each other with regard to magnetization, the presence of the inductance S causes only a low damping of the telephone currents. The subscriber's set also has 10 push buttons (not shown), which control calling contacts K12, K34, K56, K78 and K90, by means of which the capacitor C2 can be connected to different tappings on the inductance S. The push buttons corresponding to the calling digits 1 and 2 control the contact K12, the buttons corresponding to the digits 3 and 4 control the contact K34, the buttons corresponding to the digits 5 and 6 control the contact K56, the buttons corresponding to the digits 7 and 8 control the contact K78 and the buttons corresponding to the digits 9 and 0 control the contact K90. The push buttons also control the common contacts KA and KB, in a manner such that contact KA is opened only after contact KB has been opened and one of the contacts K12 . . . K90 closed. Furthermore, the buttons corresponding to the even digits 0, 2, 4, 6 and 8 control a common contact KE.

Said circuit arrangement operates as follows:

When one of the push buttons is depressed, capacitor C2, as previously mentioned, is connected parallel to part of the inductance S, resulting in an oscillatory circuit being formed, the frequency of which is dependent upon the digit chosen. Contact KB interrupts the connection between inductance S and capacitor C1. Subsequently, contact KA interrupts the above-described direct-current circuit via winding S1, resulting in an oscillation being produced in said oscillatory circuit, which is transferred via a transistor TR1 to the subscriber's line L1, L2. The base *b* of the transistor is connected via resistor R2 to the capacitor C2, its emitter *e* is connected via make contact *h2* to conductor L2, and its collector *c* is connected via a current-limiting resistor R3, bridged by a capacitor C3, and make contact *h1* to the line wire L1. In this arrangement, in which the oscillation to be amplified is supplied between the base and the collector of the transistor (which arrangement is in certain cases referred to as a "common collector circuit"), the input resistance of the base is very high. The oscillatory circuit is thus damped only slightly and the frequency produced is substantially independent of the properties of the line due to the oscillatory circuit being coupled to the line only very loosely. The strong decrease in direct current through the subscriber's line indicates in the exchange that there is called and that a device must be made operative for determining the frequency of the calling oscillation. During calling, the microphone M is not connected to the subscriber's line, so that the calling signal produced cannot be interfered by telephone currents. In the depressed condition of the push-button, a certain direct-current continues to flow through resistor R3 and transistor TR1, thus preventing the connection from being interrupted in the exchange.

It would fundamentally have been possible to distinguish the 10 digits to be called in the described manner by means of 10 different frequencies. However, in order to obtain wider tolerances, the number of frequencies is in this case limited to five and use has been made of an additional criterion for distinguishing between the even digits and the odd digits. As previously mentioned, the calling contact KE is closed when an even digit is called. Consequently, capacitor C1 charges during the calling period via a high-ohmic resistor R4 to the voltage of the line, so that upon release of the push-button, whereby at first contact KA and subsequently contact KB closes, an oscillation is produced in the oscillatory circuit comprising inductance S, make contact *h*1, capacitor C1 and back contact KB. This oscillation occurs after the direct-current path via the subscriber's set is again closed and may thus be distinguished in the exchange from the calling oscillation proper. This additional oscillation is absent when an odd digit is called.

Figure 2:
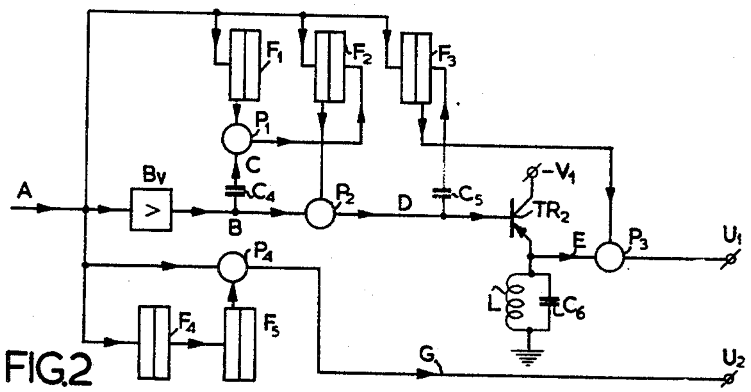
FIGURES 2 and 3 show parts of a telephone exchange for the reception of said signals, and FIG. 4 relates to a number of voltage-time diagrams.
Figure 4:
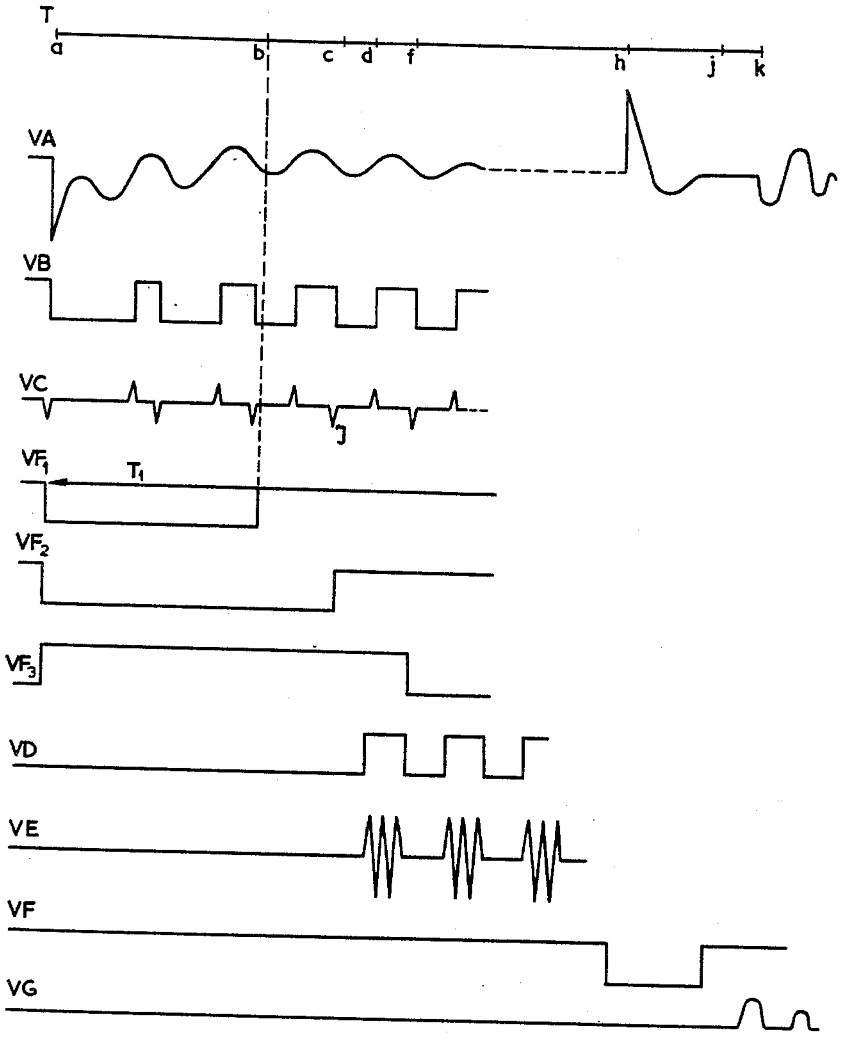

The calling signals are supplied in the exchange, in a manner not shown, to the conductor A of the arrangement shown in FIG. 2, resulting in a voltage which varies with time as represented by the curve VA in FIG. 4. When a push-button on the subscriber's set is depressed at the moment *a*, the direct-current circuit via the subscriber's set is interrupted and a strong negative pulse occurs at point A. The disappearance of the direct current results in a swinging-out phenomenon across the subscriber's line and hence in an interfering oscillation, which interferes with the calling oscillation, but which is damped to a much greater extent than the latter. The over-controlled amplifier BV converts the voltage at point A into a block voltage at point B, as represented by the curve VB in FIG. 4. The amplitude of this block voltage is substantially independent of the damping of the oscillations caused by the line. The duration of the half periods of the block voltage is still influenced by the interfering oscillation during the first moments, as may appear from curve VB. In order to eliminate the influence of the interfering oscillation, the circuit is so arranged that the frequency of the calling oscillation is determined only at a moment when the interfering oscillation has substantially disappeared. The strong negative pulse at point A brings the mono-stable trigger circuits F1, F2 and F3 from the rest condition into their operating condition. The trigger circuits are so adjusted that they cannot be influenced by the weaker calling oscillations which follow later. The trigger circuits F1 and F2 control gate circuits P1 and P2, respectively in a manner such that they are cut off in the operating condition of the circuits, whereas the trigger circuit F3 controls a gate circuit P3 in a manner such that it is conducting in the operating condition of the trigger circuit. The block voltage at point B is differentiated by a capacitor C4, resulting in pulses at point C, the variation of which is represented as a function of time by the curve VC in FIG. 4.

After a certain period which is sufficient for unwanted oscillations on the subscriber's line to be damped away the trigger circuit F1 returns independently to the rest condition at the moment *b*, so that the gate circuit P1 is opened and transfers the pulses to the trigger circuit F2 which, by the action of the next-following negative pulse I, returns to the rest condition at the moment *c* and opens gate circuit P2. The gate circuit P2 passes the positive periods of the block voltage VB shown in FIG. 4, resulting in a block voltage at point D, such as represented by the curve VD in FIG. 4.

In the device shown, the frequency of the calling oscillations is determined by measuring the duration of a half-wave of these oscillations. For this purpose, the arrangement comprises an oscillatory circuit, constituted by an inductance L and a capacitor C6, which is included in the emitter circuit of a transistor TR2. The collector of this transistor is connected to a voltage source −V1 and its base is connected to the output of the gate circuit P2, so that the transistor, normally, is conducting and a quantity of magnetic energy is accumulated in the inductance L. The transistor TR2 is cut off during the positive period of the block voltage at point D, resulting in an oscillation across the oscillatory circuit LC6, which is abruptly damped very strongly at the end of the positive period when transistor TR2 again becomes conducting. A voltage thus results at point E such as represented by the curve VE in FIG. 4. The gate circuit P3 transfers this oscillation to conductor U1 during the first positive period of the voltage at point D (that is to say during the time between the moments *d* and *f*, corresponding to the measuring period proper) which conductor U1 is connected to conductor U1 of FIG. 3. At the moment *f*, capacitor C5 transfers a pulse to the trigger circuit F3, which thus returns to its rest condition and closes the gate P3, so that the latter does not supply any further oscillations to the conductor U1. The frequency of the calling oscillations is chosen in connection with the natural frequency of the oscillatory circuit LC6 in a manner such that during the measuring period the gate circuit P3 passes one pulse at the highest calling frequency, passes two pulses at the second-highest calling frequency, etc. The number of pulses being passed is measured by the arrangement of FIG. 3 in a manner which will be described hereinafter.

When the calling button on the subscriber's set is released at the moment *h*, at first the contact KA in the subscriber's set closes resulting in the direct-current circuit via the subscriber's line being closed and a strong positive pulse occurring at point A of the arrangement of FIG. 2, which pulse is usually accompanied by an interfering oscillation upon discharge of the subscriber's line, which oscillations is strongly damped. A short time afterwards, the calling contact K12 or K34, etc. in the subscriber's set opens and contact KB closes. If an odd digit were chosen, nothing happens at all. If, however, an even digit were chosen, capacitor C1 is charged via make contact KE and resistor R4, so that upon closure of contact KB a low-frequency oscillation occurs in the oscillatory circuit comprising the inductance S, contact KB, capacitor C1 and make contact *h*1, which oscillation is transferred via the handset circuit to the subscriber's line and at the moment *k* gives rise to an additional oscillation at point A of the arrangement of FIG. 2. The strong positive pulse at the moment *h* brings the monostable trigger circuit F4 into its operating condition. After a certain period which suffices for the interfering oscillation on the subscriber's line to disappear, the trigger circuit F4 returns independently to the rest condition at the moment *j*, giving off a pulse to the monostable trigger circuit F5, which in turn changes over to its operating condition, opens the grate P4 and, after a certain period, returns independently to the rest condition. The gate P4 is so adjusted that comparatively weak oscillations, such as telephone currents, are not passed. If an even digit were chosen, the gate circuit P4 transfers the additional oscillation to the conductor U2 such as represented by the curve VG in FIG. 4.

Figure 3:
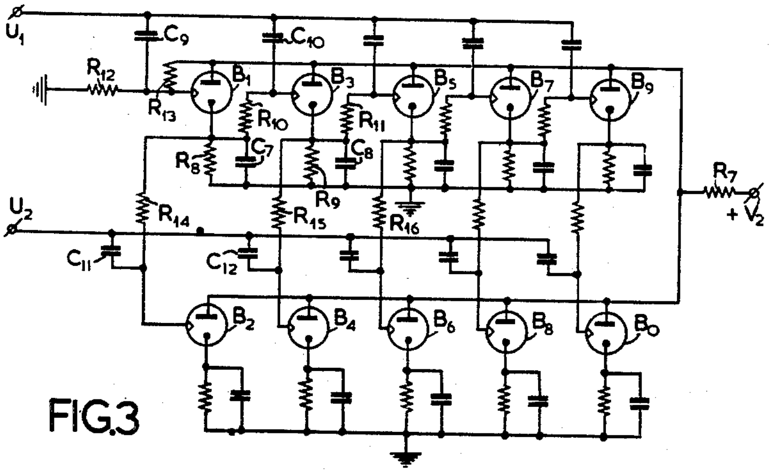

The pulses to be passed by the gate P3 are counted by the arrangement shown in FIG. 3, which comprises a counting circuit having a plurality of gas-tubes B1, B3, B5, B7 and B9 for registering the odd digits and a register circuit having gas-tubes B2, B4, B6, B8 and B0 for registering the even digits. The counting circuit is designed in a manner known per se. The anodes of the various tubes are connected via a common resistor R7 to a source of positive potential V2, their cathode circuits including individual resistors A8, A9 etc., bridged by capacitors C7, C8 etc. The ignition electrodes of the tubes B3, B5, etc. of the counting circuit are each connected via resistors R10, R11, etc. to the cathode of the preceding tube. The ignition electrode of tube B1 is connected to a tapping on the potentiometer R12, R13, R7 so that in the rest condition of the circuit, in which all tubes are extinguished, this ignition electrode has a voltage which is higher than the voltage on the ignition electrodes of the other tubes of the counting circuit and a little lower than the ignition voltage. The pulses to be counted are supplied via conductor U1 and capacitors C9, C10, etc. to the ignition electrodes of the tubes B1, B3, etc. of the counting circuit. This circuit arrangement operates as follows:

The first pulse causes ignition of tube B1. The second pulse ignites tube B3, since the voltage of its ignition electrode at this moment is higher than that of the other ignition electrodes, whilst tube B1 extinguishes as a result of a negative pulse occurring on its anode. Similarly, the third pulse ignites tube B5, etc. The ignition electrodes of the tubes B2, B4, B6, B8 and B0 are each connected via resistors R14, R15, etc. to the cathode of a tube of the counting circuit and coupled via capacitors C11, C12, etc. to the conductor U2. If, for example, the digit 5 is chosen, the counting circuit receives three pulses, so that ultimately only tube B5 is conducting. If the digit 6 were chosen, the counting circuit also receives three pulses and tube B5 becomes conducting. In this case, however, as previously mentioned, after release of the calling button, additional pulses are supplied to the conductor U2, so that tube B6 is ignited due to its ignition electrode, which is connected via resistor R16 to the cathode of tube B5, having a biassing potential which is a little lower than the ignition voltage. Furthermore, tube B5 extinguishes upon ignition of tube B6 by the action of the negative pulse on its anode. When an even digit is chosen, one of the tubes B2, B4, B6, B8 and B0 is thus conducting to indicate the digit chosen.

What is claimed is:

1. An automatic signalling system comprising a voice frequency transmission channel, means for selectively producing a plurality of electrical oscillations each of different frequency and each corresponding to a respective given calling signal, means connected to said transmission channel for determining the duration of a half period of said oscillations at the respective frequency thereof, and means for producing a plurality of signal responses each respectively determined by the time duration of the said half periods of said oscillations.

2. An automatic signalling system as claimed in claim 1 further comprising a delay system and means comprising said delay system for actuating said duration determining means after a given interval following the initiation of said oscillation.

3. An automatic signalling system as claimed in claim 2 wherein said delay system comprises first and second trigger circuits, a gating path, means responsive to said second trigger circuit for closing said path, means responsive to said oscillations for actuating said trigger circuits thereby to close said path at the initiation of said oscillations, and means comprising said first trigger circuit for resetting said second trigger circuit after a predetermined time interval thereby to open said gate after said predetermined time interval.

4. An automatic signalling system as claimed in claim 1 wherein said duration determining means comprises first and second trigger circuits, a first gate and a second gate, means responsive to said first trigger circuit for closing said first gate, means responsive to said second trigger circuit for opening said second gate, means responsive to said oscillations for actuating said trigger circuits thereby to close said first gate and open said second gate, means for resetting said first trigger circuit after a predetermined time interval thereby to open said first gate after said predetermined time interval and means responsive to the opening of said first gate to close said second gate after a predetermined time interval following the opening of said first gate.

5. An automatic signalling system as claimed in claim 4 further comprising an oscillation generator connected in the path between said first and second gates, and means for actuating said generator during the interval between the opening of said first gate and the closing of said second gate.

6. An automatic signalling system as claimed in claim 5 wherein said generator comprises an oscillatory circuit, means for supplying a direct current to said circuit, and an electronic switch member arranged for interrupting said direct current upon actuation by signal energy transmitted through said first gate upon the opening thereof.

7. An automatic signalling system comprising a voice frequency transmission channel, means for selectively producing a plurality of electrical oscillations each of different frequency and each corresponding to a respective given calling signal, means connected to said transmission channel for determining the duration of a half period of said oscillations at the respective frequency thereof, said means comprising an oscillation generator having a frequency greater than the frequency of said oscillations, means for actuating said oscillation generator during an interval corresponding to the half period of said oscillations thereby to produce signals each having a plurality of cycles in number determined by the duration of said half periods, and means for counting the said cycles of said signals thereby to determine the duration of said half periods.

8. An automatic signalling system as claimed in claim 7 wherein said means for selectively producing a plurality of oscillations further comprises means for producing an additional oscillation, means for actuating said additional oscillation producing means in sequence with said oscillation producing means thereby to produce combination signals of said oscillations selectively with said additional oscillation, and wherein said means for counting the said cycles comprises means for modifying the counting of said signals in response to a signal corresponding to said additional oscillation.

References Cited in the file of this patent

UNITED STATES PATENTS

| | | |
|---|---|---|
| 2,642,500 | Fritschi et al. | June 16, 1953 |
| 2,817,828 | McGuigan et al. | Dec. 24, 1957 |